United States Patent [19]

Yoshizawa

[11] Patent Number: 5,676,037
[45] Date of Patent: Oct. 14, 1997

[54] APPARATUS FOR MUTUAL CONVERSION BETWEEN CIRCULAR MOTION AND RECIPROCAL MOTION

[75] Inventor: Yasuo Yoshizawa, Yonezawa, Japan

[73] Assignee: Yoshiki Industrial Co., Ltd., Yamagata-ken, Japan

[21] Appl. No.: 620,913

[22] Filed: Mar. 25, 1996

Related U.S. Application Data

[62] Division of Ser. No. 241,470, May 12, 1994, Pat. No. 5,535,709.

[30] Foreign Application Priority Data

Mar. 18, 1994 [JP] Japan .................................. 6-049506

[51] Int. Cl.⁶ ........................... F16H 21/18; F02B 75/16
[52] U.S. Cl. ................... 92/138; 92/140; 74/45; 123/63; 123/197.3
[58] Field of Search .................................. 74/45; 92/138, 92/140; 123/197.3, 197.4, 61 R, 63

[56] References Cited

U.S. PATENT DOCUMENTS

| 629,392 | 7/1899 | Protheroe et al. ................ 74/45 |
| 1,664,150 | 3/1928 | Augner ................................. 123/63 |
| 2,055,396 | 9/1936 | Yoxall ................................. 92/140 |
| 5,182,567 | 1/1993 | Yoshizawa et al. ............... 392/389 |

FOREIGN PATENT DOCUMENTS

| 1175053 | 7/1964 | Germany . |
| 42 00 707 A1 | 7/1993 | Germany . |
| 629814 | 9/1949 | United Kingdom . |
| 1060298 | 3/1967 | United Kingdom . |

OTHER PUBLICATIONS

Patent Abstracts of Japan, vol. 007, No. 044 (M-195), Feb. 22, 1983 & JP-A-57 192663 (Fuji Hensokuki KK) Nov. 26, 1982.

Primary Examiner—Allan D. Herrmann
Attorney, Agent, or Firm—Frishauf, Holtz, Goodman, Langer & Chick

[57] ABSTRACT

An apparatus for mutual conversion between circular motion and reciprocal motion includes a lever member which is rotatably mounted on a line connecting a rotational center and a circumference of a rotary disk, the lever member having a fulcrum, an action point and a force point, and being provided with a first regulator serving as an action point regulator and a second regulator serving as a movable fulcrum regulator. The first regulator is coupled to a reciprocating body. The movable fulcrum regulator has support members for supporting the fulcrum point and the first regulator has support members for supporting the action point in a longitudinal direction of the lever member.

3 Claims, 17 Drawing Sheets

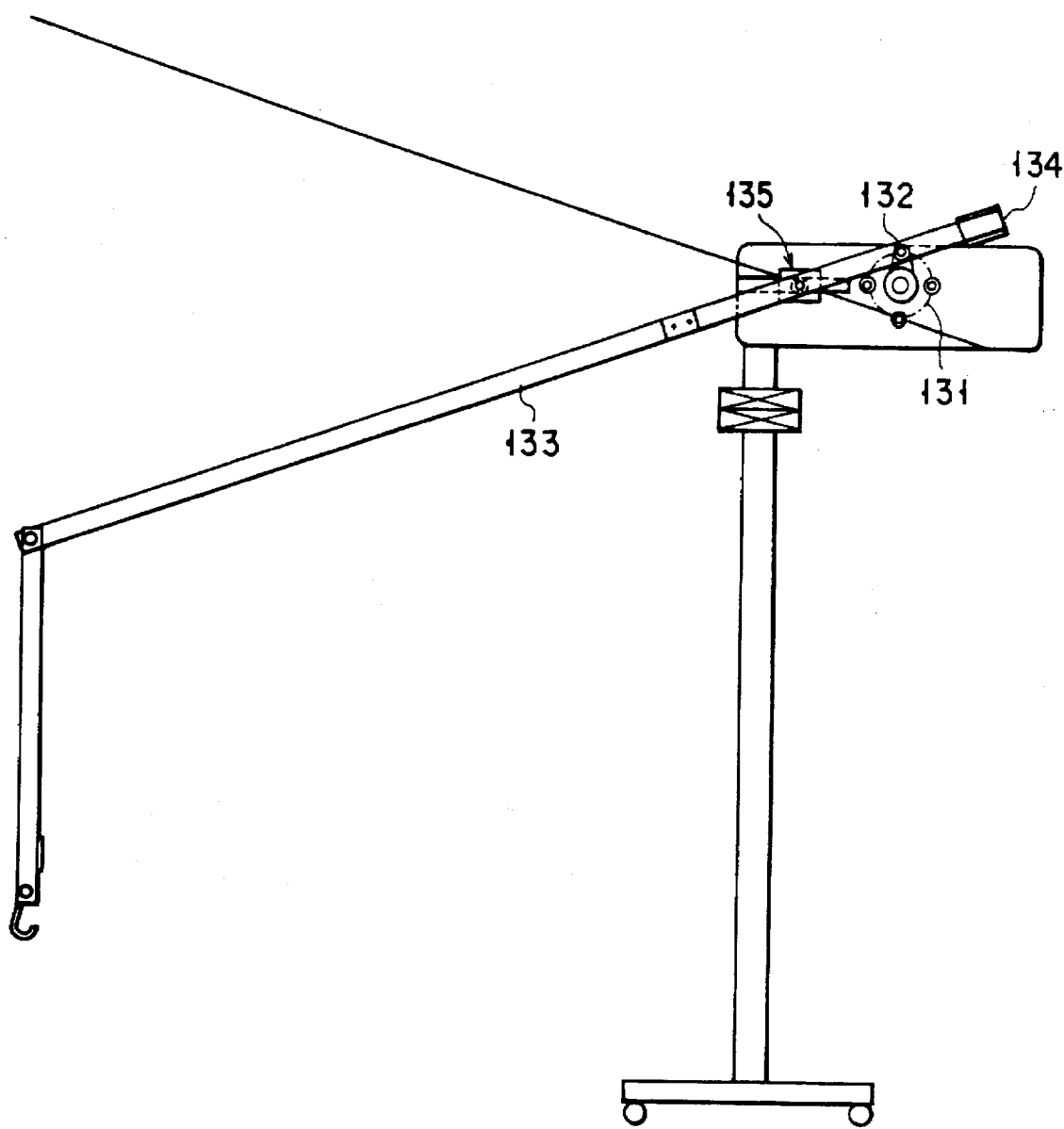
F I G. 15

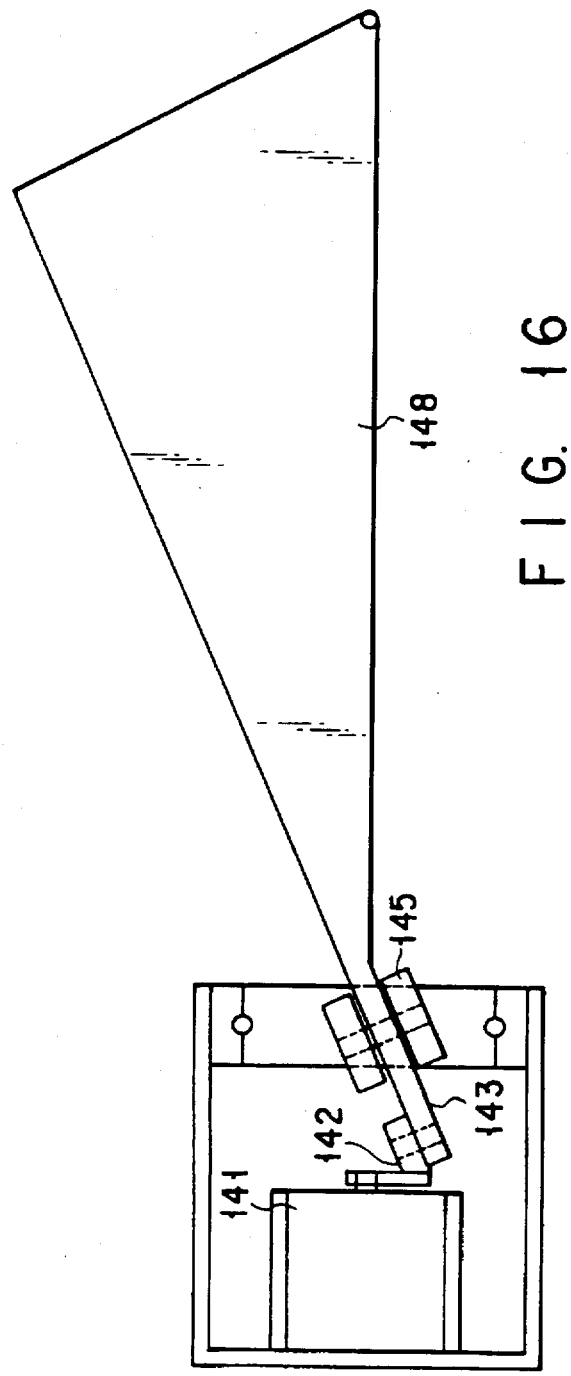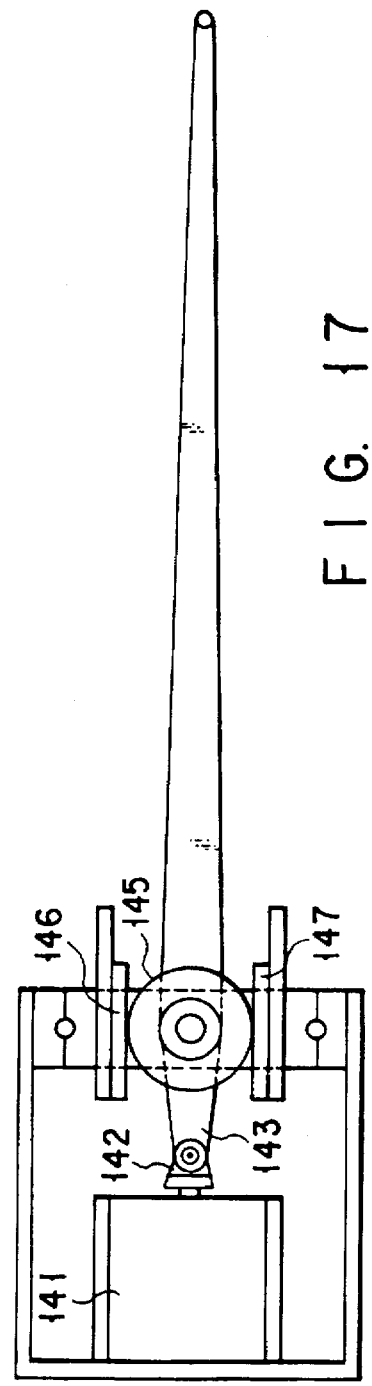

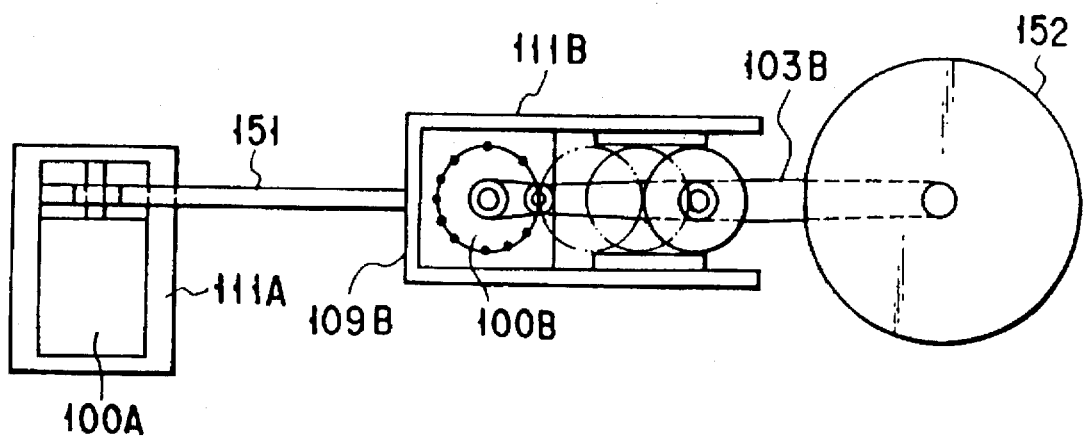
F I G. 20A
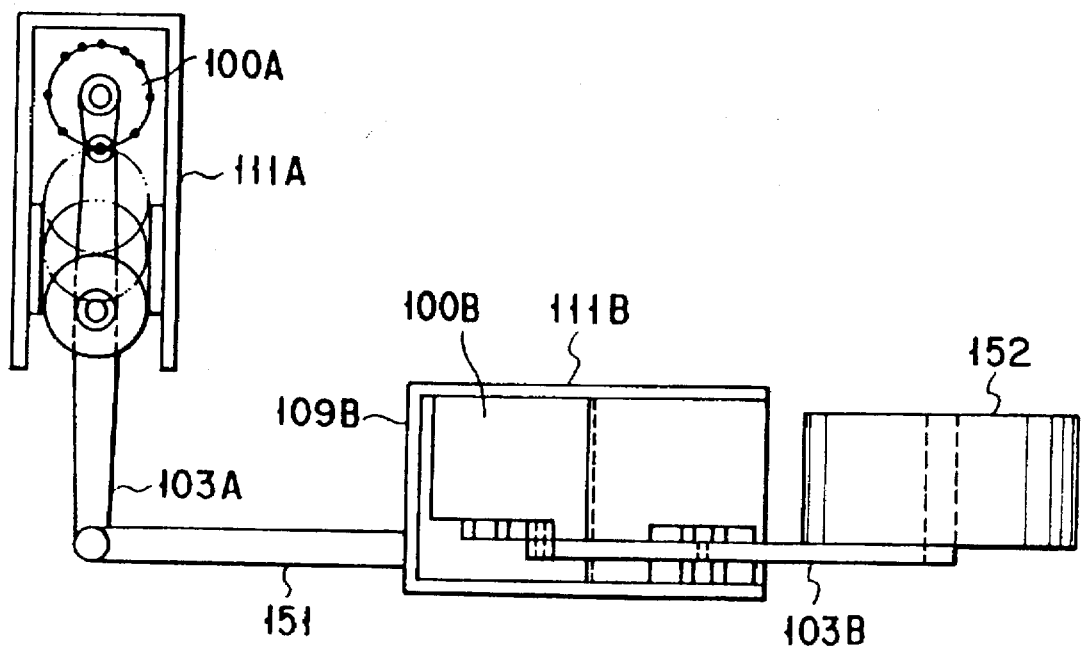
F I G. 20B 5,676,037

APPARATUS FOR MUTUAL CONVERSION BETWEEN CIRCULAR MOTION AND RECIPROCAL MOTION

This is a division of application Ser. No. 08/241,470 filed May 12, 1994 now U.S. Pat. No. 5,535,709.

BACKGROUND OF THE INVENTION

1. Field of the Invention

The present invention relates to an apparatus for mutual conversion between circular motion and reciprocal motion which is used for converting reciprocal motion of, e.g., the piston of a four-cycle reciprocating engine into rotary motion of a crankshaft.

2. Description of the Related Art

As one of the factors that hinder an increase in output efficiency of a four-cycle reciprocating engine, the unavoidable side thrust of a piston is known. This side thrust cannot be avoided since the piston and the crankshaft are coupled to each other by using a connecting rod. More specifically, since the reciprocal motion of the piston is not smoothly transmitted to the crankshaft, the side thrust is increased, thus causing an energy loss.

In this manner, conventionally, crank motion intervenes to convert linear motion into rotary motion. However, since the piston oscillates as the crank moves, in, e.g., a four-cycle reciprocating engine, a side thrust is generated between the piston and the cylinder. Therefore, the engine idling speed must be increased to about 1,000 rpm, causing a problem in fuel consumption as well.

The side thrust causes an energy loss. Moreover, the piston must be made of a heavy, strong metal in order to prevent damage to the piston, e.g., cracking, partial breaking, and the like of the piston caused by collision of the piston against the inner wall of the cylinder. Then, the weight of piston cannot be decreased by making the piston with, e.g., a ceramic.

SUMMARY OF THE INVENTION

It is, therefore, an object of the present invention to provide an apparatus for mutual conversion between circular motion and reciprocal motion that can decrease an energy loss caused when converting the reciprocal motion of the piston of, e.g., a four-cycle reciprocating engine into the rotary motion of the crankshaft and can decrease the weight of the engine by forming the piston with a ceramic.

According to an aspect of the present invention, there is provided an apparatus for mutual conversion between circular motion and reciprocal motion, comprising: a lever member having a fulcrum as well as an action point and a force point one of which is rotatably mounted at a point on a line connecting a rotational center and a circumference of a rotary body, the action point or force point being provided with a first regulator and the fulcrum being provided with a second regulator for functioning the fulcrum as a movable fulcrum, wherein the first regulator is coupled to a reciprocating body, and the first and second regulators including support members for supporting one of the force point or action point and the fulcrum to be movable in a longitudinal direction of the lever member.

According to another aspect of the present invention, there is provided an apparatus for mutual conversion between circular motion and reciprocal motion, comprising: a rotary body; a lever member having a fulcrum as well as an action point and a force point one of which is rotatably mounted at a point on a line connecting a rotational center and a circumference of the rotary body, one of the action point and the force point being provided with a first regulator and the fulcrum being provided with a second regulator for functioning the fulcrum as a movable fulcrum; and a reciprocating body to which one of the action point and the force point provided with the first regulator is coupled; wherein the first and second regulators include support members for supporting one of the force and action points and the fulcrum to be movable in a longitudinal direction of the lever member.

According to a further aspect of the present invention, there is provided an apparatus for mutual conversion between circular motion and reciprocal motion, comprising: a rotary body; a lever member having a fulcrum as well as a force point and an action point which is rotatably mounted at a point on a line connecting a rotational center and a circumference of a rotary body, the force point being provided with a first regulator and the fulcrum being provided with a second regulator for functioning the fulcrum as a movable fulcrum; and a reciprocating motor to which the force point provided with the first regulator is coupled; wherein the first and second regulators include support members for supporting the force point and the fulcrum to be movable in a longitudinal direction of the lever member.

According to still another aspect of the present invention, there is provided an apparatus for mutual conversion between circular motion and reciprocal motion, comprising: a rotary motor; and a lever member having a fulcrum as well as a force point and an action point which is rotatably mounted at a point on a line connecting a rotational center and a circumference of a rotary motor, the action point being provided with a first regulator and the fulcrum being provided with a second regulator for functioning the fulcrum as a movable fulcrum, and the action point provided with the first regulator being coupled to a reciprocating body of a reciprocated machine; wherein the first and second regulators include support members for supporting the action point and the fulcrum to be movable in a longitudinal direction of the lever member.

According to still another aspect of the present invention, there is provided an apparatus for mutual conversion between circular motion and reciprocal motion, comprising: a rotary body; and a lever member having a fulcrum as well as a force point and an action point which is rotatably mounted at a point on a line connecting a rotational center and a circumference of the rotary body, the force point being provided with a first regulator and the fulcrum being provided with a second regulator for functioning the fulcrum as a movable fulcrum; wherein the force point provided with the first regulator is coupled to a piston of a reciprocating motor, the piston is movably mounted in a cylinder, the cylinder has inlet and exhaust units of a power gas at each of two ends thereof, and the first and second regulators have support members for supporting the force point and the fulcrum to be movable in a longitudinal direction of the lever member.

According to still another aspect of the present invention, there is provided an apparatus for mutual conversion between circular motion and reciprocal motion, comprising: a rotary body; and a lever member having a fulcrum as well as a force point and an action point which is rotatably mounted at a point on a line connecting a rotational center and a circumference of the rotary body, the force point being provided with a first regulator and the fulcrum being provided with a second regulator for functioning the fulcrum as a movable fulcrum; wherein the force point provided with the first regulator is coupled to a piston of a reciprocating motor, the piston is movably mounted in a cylinder, the cylinder has inlet and exhaust units of a fuel gas and an ignition unit at each of two ends thereof, and the first and second regulators have support members for supporting the force point and the fulcrum to be movable in a longitudinal direction of the lever member.

According to the gist of the present invention, a lever member has a fulcrum as well as a force point and an action point one of which is rotatably and axially mounted on a line connecting a rotational center and a circumference of a rotary body, one of the force and action points being provided with a first regulator and the fulcrum being provided with a second regulator serving the fulcrum as a movable fulcrum, the first regulator being coupled to a reciprocating body, and the first and second regulators being provided with supporting members for supporting one of the force and action points and the fulcrum to be movable in a longitudinal direction of the lever member.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 15 is a schematic side view showing still another embodiment of the present invention;

FIG. 16 is a schematic side view showing still another embodiment of the present invention;

FIG. 17 is a schematic side view showing still another embodiment of the present invention;

FIGS. 20A and 20B are schematic side views showing still another embodiment of the present invention;

DETAILED DESCRIPTION OF THE PREFERRED EMBODIMENTS

The preferred embodiments of the present invention will be described in detail with reference to the accompanying drawings.

Figure 1:
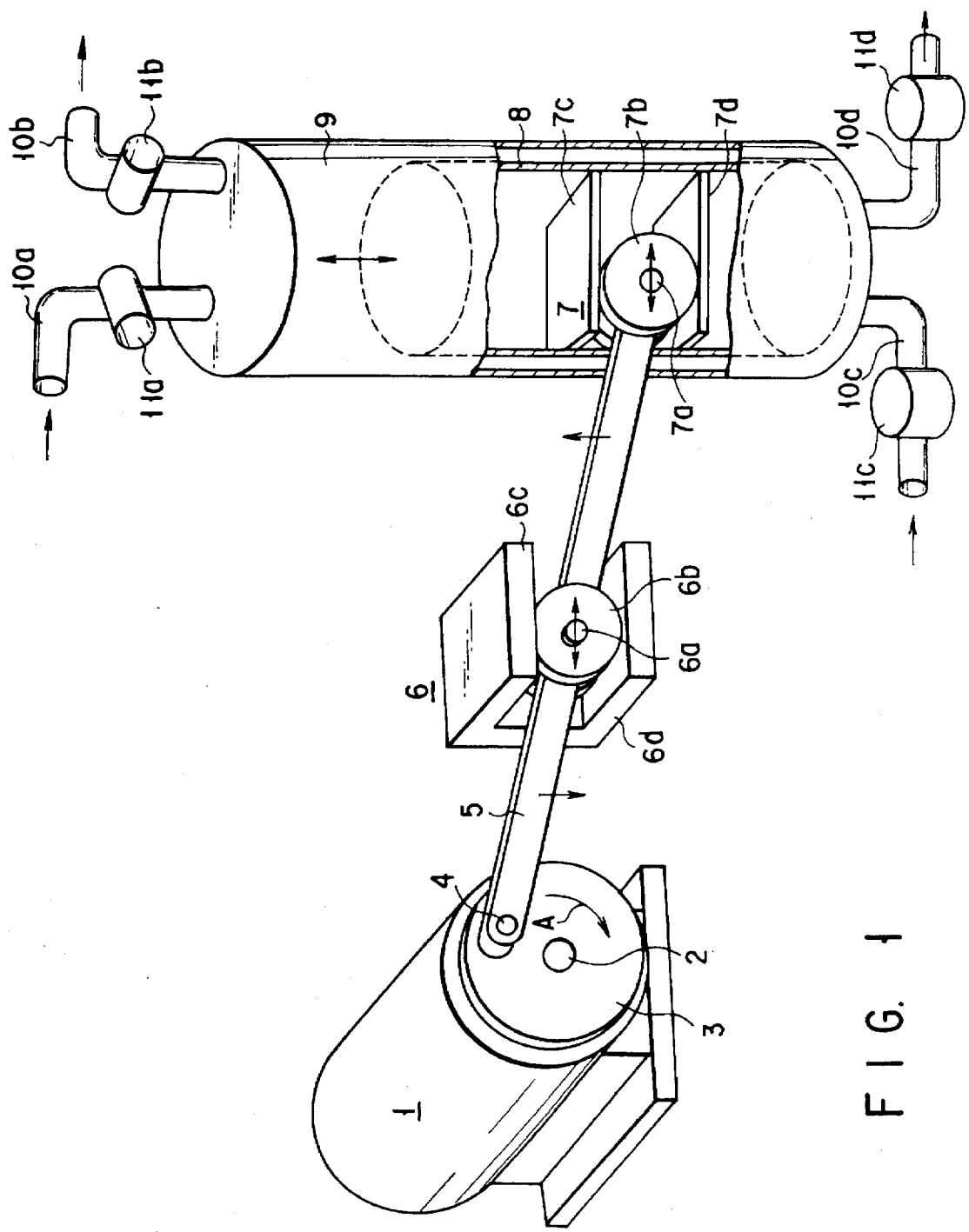
FIG. 1 is a perspective view showing an embodiment of the present invention.

FIG. 1 is a perspective view showing the overall arrangement of an embodiment of the present invention. This embodiment has a lever member 5 whose one end serving as a force point is rotatably mounted, through a pin 4, to a position close to the circumference of a disk 3 mounted to a rotating shaft 2 of a motor 1.

The fulcrum 6a of the lever member 5 is rotatably supported by a fulcrum regulator 6 so that the fulcrum is movable in its longitudinal direction. The fulcrum 6a is a pin and is mounted on the lever member 5 so as to support a roller 6b rotatably to the lever member 5 through the pin 6a. The fulcrum regulator 6 is composed of the roller 6b and guide plates 6c and 6d for guiding the roller 6b as well as the lever member 5 to be movable in the longitudinal direction of the lever member 5.

An action point regulator 7 is provided to the action point 7a at the other end of the lever member 5. The action point regulator 7 has a roller 7b rotatably mounted to the other end of the lever member 5 through a pin 7a, and guide plates 7c and 7d for guiding the roller 7b so that the roller 7b as well as the action point 7a are movable in the longitudinal direction of the lever member 5.

The action point regulator 7 is fixed to substantially the central portion of a cylindrical piston 8, and the piston 8 is inserted in a cylinder 9. Piston rings (not shown) are mounted at the peripheral portions near to the both end portions of the piston 8 so as to seal a gap between the piston 8 and the inner wall of the cylinder 9.

Pairs of inlet and exhaust pipes 10a and 10b, and 10c and 10d are mounted to the two end faces of the cylinder 9, and opening/closing valves 11a, 11b, 11c, and 11d are provided to the respective pipes.

In this arrangement, when the motor 1 is connected to a power supply and driven, the disk 3 is rotated in, e.g., the direction of an arrow A shown in FIG. 1, and the lever member 5 repeats pivot motion in the counterclockwise and clockwise directions every half turn of the disk 3. Accordingly, the action point 7a of the lever member 5 repeats a reciprocal motion in the direction normal to its longitudinal direction along with rotation of the disk 3.

The reciprocal motion of the action point of the lever member 5 is transmitted to the action point regulator 7, and accordingly the piston 8 performs linear reciprocal motion in the cylinder 9. At this time, the roller 7b is guided to be movable in the longitudinal direction of the lever member 5 along the guide plates 7c and 7d of the regulator 7.

In this case, when the valves 11a to 11d are opened and closed at predetermined timings as the piston 8 moves in response to the vertical movement of the lever member 5, a liquid can be taken from the pipes 10a and 10c into the cylinder 9 and exhausted from the pipes 10b and 10d, respectively.

At this time, since the side thrust of the piston 8 toward the inner wall of the cylinder 9 does not appear due to the regulators 6 and 7, and the side thrust of the lever member 5 toward the guide plates 6c, 6d, 7c, and 7d, which is caused at the movable fulcrum 6a and the action point 7a of the lever member 5, is absorbed as rotation of the rollers 6b and 7b, mechanical losses at these portions are very small.

The apparatus of the embodiment shown in FIG. 1 is a reversible apparatus. For example, when a high-pressure liquid or air is alternately supplied from the pipes 10a and 10c to vertically move the piston 8 with the high-pressure liquid or air, and the reciprocal motion of the piston 8 is transmitted to the disk 3 through the lever member 5 to rotate the disk 3, the motor 1 can be driven as a power generator.

In this case as well, since the side thrust of the piston 8 toward the inner wall of the cylinder 9 and that of the lever member 5 toward the guide plates 6c, 6d, 7c, and 7d, which is caused at the movable fulcrum 6a and the force point 7a of the lever member 5 by the reciprocal motion of the piston 8, is absorbed as rotation of the rollers 6b and 7b of the regulators 6 and 7, mechanical losses at these portions are very small.

Figure 2:
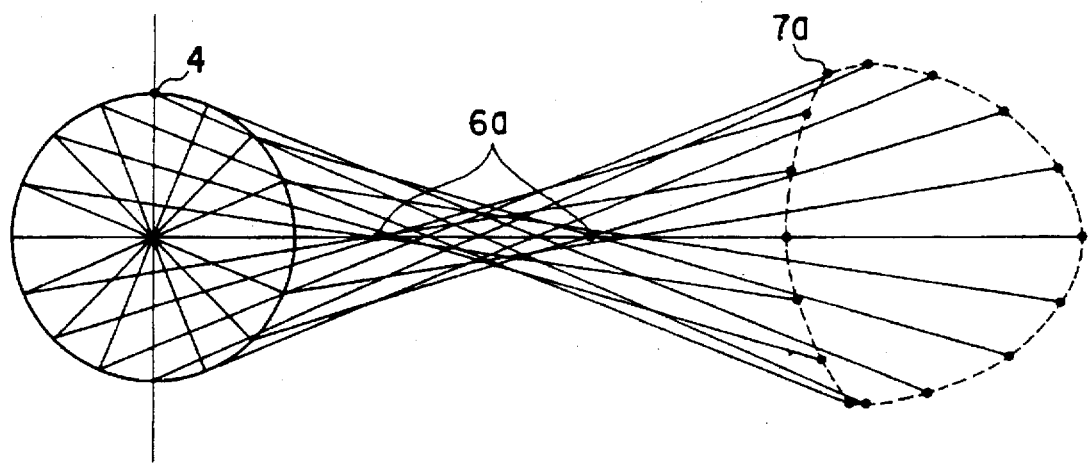
FIG. 2 is a view showing an example of the loci of rotating and reciprocating portions shown in FIG. 1.
Figure 3:
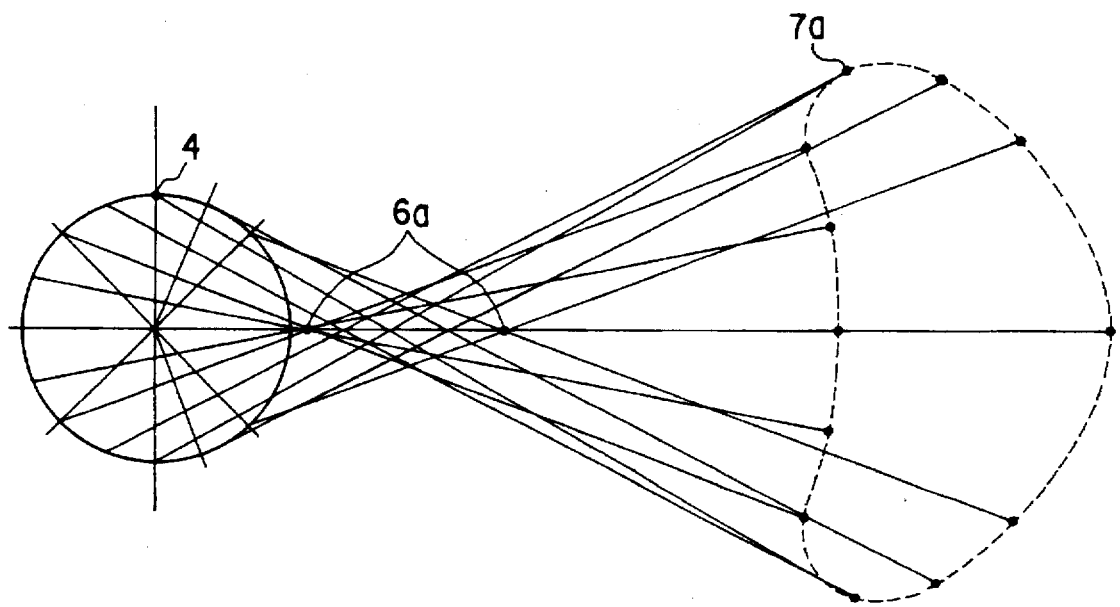
FIG. 3 is a view showing another example of the loci of the rotating and reciprocating portions shown in FIG. 1.

FIGS. 2 and 3 are views showing the loci of the pins 4, 6a, and 7a in motion which respectively serve as the force point, the fulcrum, and the action point of the lever member 5 in the embodiment shown in FIG. 1. More specifically, the pin 4 performs a complete circular motion, the fulcrum pin 6a linearly moves between the guide plates 6c and 6d in the longitudinal direction of the lever member 5, and the pin 7a moves between the guide plates 7c and 7d in response to the reciprocal motion of the piston 8 to form a locus as shown in FIG. 2 or 3. The difference in locus of the pin 7a between FIGS. 2 and 3 is caused by the difference in position of the movable fulcrum pin 6a.

Figure 4:
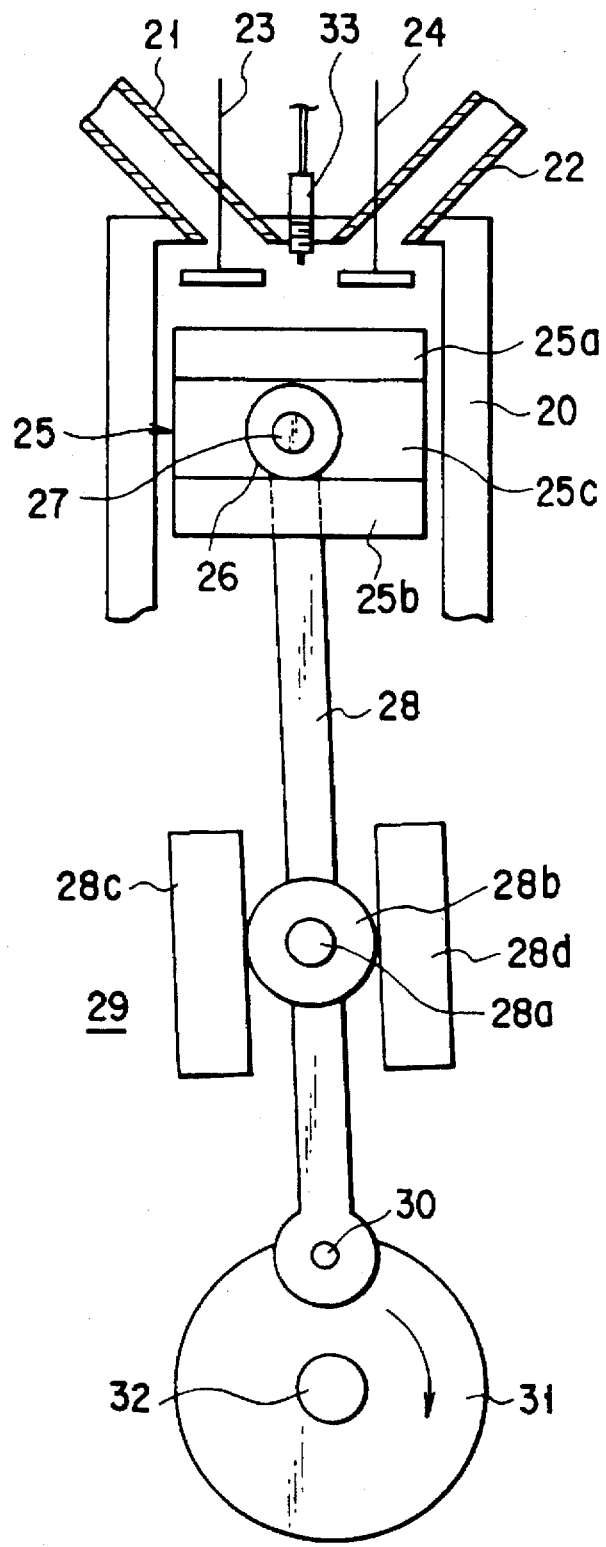
FIG. 4 is a schematic sectional view showing another embodiment of the present invention.

FIG. 4 is a view showing the schematic arrangement of an embodiment in which the present invention is applied to a four-cycle engine. An inlet pipe 21, an exhaust pipe 22, an inlet valve 23, and an exhaust valve 24 are provided at the upper portion of a cylinder 20 of the four-cycle engine.

A piston 25 is provided in the cylinder 20 to move vertically along the inner wall of the cylinder 20. Although not shown, a piston ring is mounted on the outer circumferential surface of the piston 25 to seal the piston 25 with respect to the inner wall of the cylinder 20. In the piston 25, a guide groove 25c is formed between a pair of guide plates 25a and 25b separated from each other by a predetermined distance in a direction perpendicular to the moving direction of the piston 25.

A roller 26 having an outer diameter of almost the same size as the width of the guide groove 25c is inserted in the guide groove 25c. The roller 26 is rotatably mounted to one end or force point of a lever member 28 through a pin 27. The plates 25a, 25b and the roller 26 function as a force point regulator.

The lever member 28 is supported through a movable fulcrum regulator 29 which has an arrangement identical to that of the embodiment shown in FIG. 1. The other end of the lever member 28 is rotatably coupled to the crankshaft arm 30 of a crankshaft 32 or the peripheral portion of a rotary disk through a pin. The movable fulcrum regulator 29 is constituted by a pin 28a, a roller 28b, and guide plates 28c and 28d. The guide plates 28c and 28d are provided along the direction of the reciprocal motion of the piston 25, and the roller 28b is also supported to be movable in the direction of the reciprocal motion of the piston 25.

In this embodiment, when the fuel-air mixture is ignited by an ignition plug 33 near the upper dead point in the compression stroke of the piston 25, the piston 25 is pushed down by explosion of the fuel-air mixture. This pressure is transmitted to the lever member 28 through the roller 26 and the pin 27, is then transmitted from the crankshaft arm 30 to the center rod of the crankshaft 32.

In the embodiment of FIG. 4, the piston 25 is urged against the inner wall of the cylinder 20 by the pressure of the explosion. Since the piston 25 and the lever member 28 are coupled to each other through the regulator composed of the plates 25a and 25b and the roller 26 serving as a force point regulator and through the regulator 29 serving as the movable fulcrum regulator, the force urging the piston 25 is fully transmitted to the crankshaft arm 30 and does not receive any counteraction from the lever member 28, so that the side thrust is greatly decreased as compared to a conventional reciprocal engine. Similarly, the fulcrum 28a of the lever member 28 is supported by the movable fulcrum regulator 29, and accordingly the reciprocal motion of the piston 25 is converted into a rotary motion with a small mechanical loss.

In this case, since the piston 25 is not urged against the inner wall of the cylinder 20 by a large force, the major portion of the piston 25 can be formed of, e.g., a ceramic. Since the side thrust is decreased, the energy loss is decreased, and the idling speed can be decreased to, e.g., 50 rpm or less, leading to a great advantage in fuel consumption as well.

Figure 5:
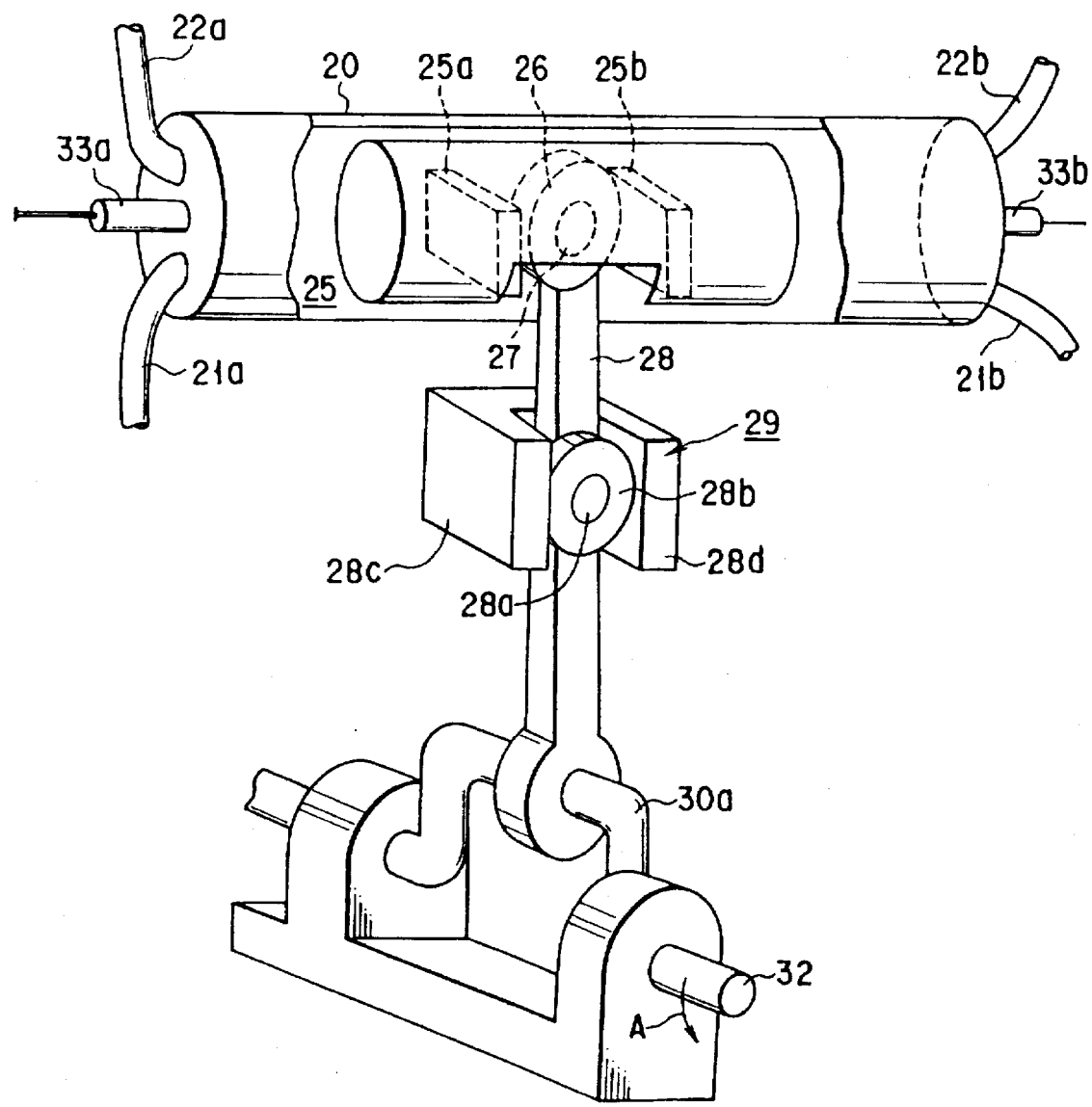
FIG. 5 is a perspective view showing still another embodiment of the present invention.

In the embodiment of FIG. 5, two cylinders and two pistons each identical to that of the embodiment in FIG. 4 are coaxially coupled to have a simplified arrangement, thereby further improving the efficiency. Accordingly, in FIG. 5, portions corresponding to those in the arrangement of FIG. 4 are denoted by the same reference numerals, and a detailed description thereof will be omitted or simplified.

Referring to FIG. 5, pairs of inlet pipes 21a and 21b, exhaust pipes 22a and 22b, and ignition plugs 33a and 33b are mounted to the two end faces of a cylinder 20. A piston 25 is inserted in the cylinder 20, and a pin 27 acting as a force point and a roller 26 and guide plates 25a and 25b serving as a force point regulator are provided in the piston 25. The pin 27 is mounted to one end of a lever member 28, and the lever member 28 is rotatably coupled to a crankshaft arm or a power receiving portion 30a of a crankshaft 32 through a fulcrum regulator 29. The power receiving portion 30a corresponds to the crankshaft arm 30 of the crankshaft 32 in the embodiment of FIG. 4.

In the embodiment of FIG. 5, the inlet pipes 21a and 21b, and the exhaust pipes 22a and 22b are opened and closed by valves (not shown) at predetermined timings. These portions may have the same arrangement as that of a conventional four-cycle engine and the detailed explanations thereof are thus omitted.

Assume that the crankshaft 32 is rotated by a starter motor (not shown), that, e.g., the piston 25 is moved in the cylinder 20 to come close to the left end in FIG. 5, and that the fuel-air mixture is compressed at this time when the fuel-air mixture is ignited by the ignition plug 33a, the piston 25 is pushed to the right in FIG. 5, and the lever member 28 is rotated in the clockwise direction through the pin 27 as well as the force point regulator. When the lever member 28 is rotated about the fulcrum pin 28a clockwise, the crankshaft 32 is rotated in the counterclockwise direction. As a result, the piston 25 is moved in the cylinder 20 to come close to the right end in FIG. 5, and then the exhaust gas is exhausted from the pipe 22b. If it is designed that an explosion takes place in a second cylinder (not shown), the crankshaft 32 is continuously rotated.

When an explosion takes place in the second cylinder, the piston 25 in FIG. 5 is moved to the left to exhaust the exhaust gas through the pipe 22a, and simultaneously the fuel-air mixture is taken from the inlet pipe 21b. When an explosion takes place in another third cylinder as the piston 25 comes to the left end in FIG. 5, the piston 25 is moved to the right to compress the fuel-air mixture taken in the inlet pipe 21b. The piston 25 is moved in the cylinder 20 to come close to the right end in FIG. 5. When the ignition plug 33b ignites the compressed fuel-air mixture at this time, the piston 25 is pushed to the left. In this manner, the crankshaft 32 is continuously rotated in the direction shown by an arrow A.

Figure 6A:
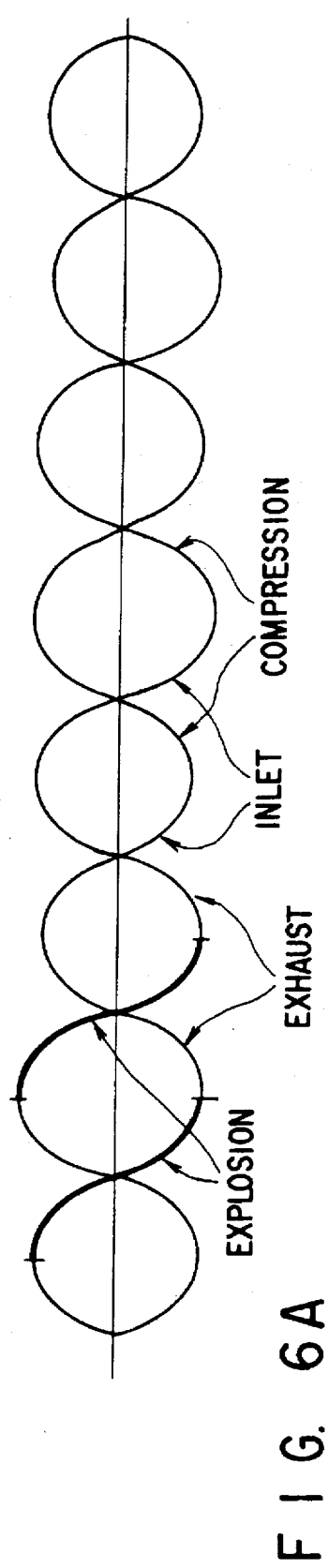
FIGS. 6A and 6B are views showing the operation processes of the embodiment shown in FIG. 5.
Figure 6B:
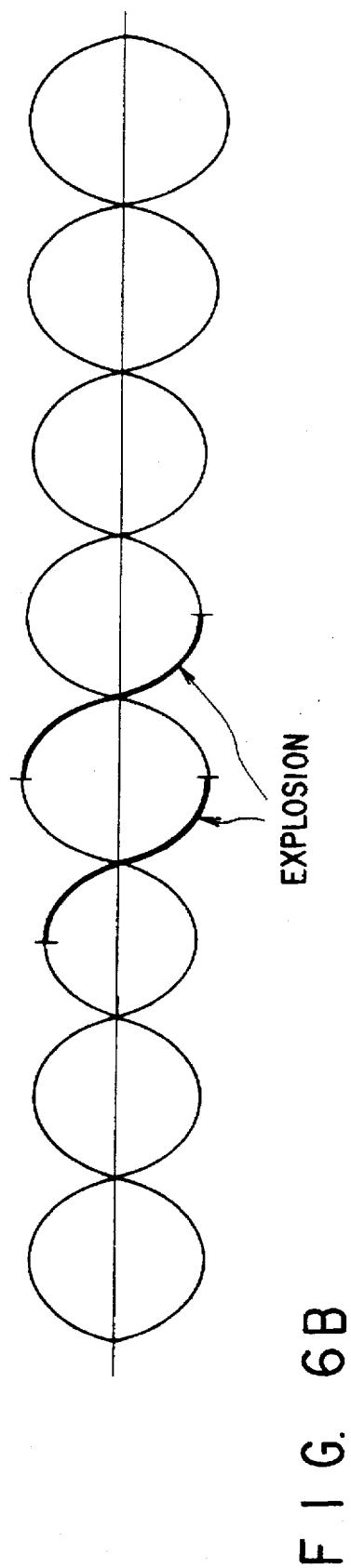

FIG. 6A shows the process of a four-cycle engine in which two cylinders having the arrangement as shown in FIG. 5 are coupled to the crankshaft 32, and FIG. 6B shows operation steps of another two cylinders of the four-cycle engine in which a total of four cylinders identical to that employed in FIG. 5 are arranged to continuously cause four-cycle operation. In this case, if the four cylinders are arranged such that an explosion always takes place in a push-pull manner at the two sides of the lever member 28 of FIG. 5, the operation efficiency is increased, thereby realizing a quiet engine having a small vibration.

In this embodiment, the piston 25 arranged with a good balance on the two sides of the pin 27, and the piston 25 only linearly contacts the guide plates 25a and 25b of the lever member 28 corresponding to the conventional connecting rod through the roller 26. Therefore, during each explosion, the piston 25 does not cause a large side thrust to act on the inner wall of the cylinder 20. Accordingly, the energy loss caused by the side thrust becomes small, so that a high-efficiency reciprocating engine can be constituted. Since a very large force does not act on the piston 25 due to the side thrust, the piston 25 can be formed of a ceramic.

When the reciprocating engine can be formed by using a ceramic, the internal temperature of the cylinder 20 can be increased to twice to three times that of a conventional engine. It is known that the heat efficiency of the conventional reciprocating engine is 20%. In this embodiment, the mechanical loss can also be largely decreased. For example, if a 10% mechanical loss can be recovered, assuming that a 70% remaining heat loss can be decreased to ⅓, a high efficiency of (10+70/3+20)%, i.e., more than 50% can be obtained.

Since the total coefficient of friction from the piston 25 to the crankshaft 32 becomes very small, a smooth movement as a whole can be obtained, and the idling speed can be reduced to, e.g., 50 rpm or less.

Figure 7:
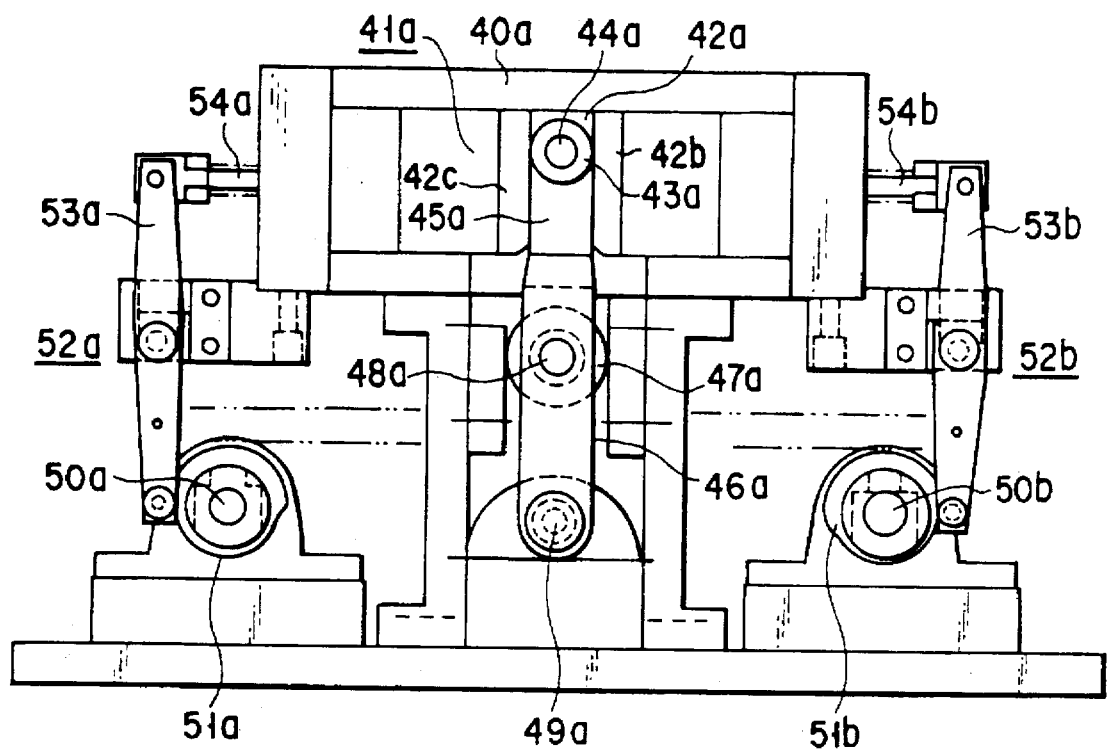
FIG. 7 is a front view showing a concrete embodiment corresponding to the embodiment shown in FIG. 5.

FIGS. 7 to 10 show an embodiment of a horizontal coaxial four-cycle engine in which a cylinder having the arrangement of the embodiment of FIG. 5 is placed horizontally. Referring to FIG. 7, a roller 43a is fitted in a guide groove 42a formed between guide plates 42b and 42c formed in a piston 41a inserted in a cylinder 40a and is mounted to one end of a lever member 45a through a pin 44a.

The roller 43a, two guide plates 42b and 42c form a force point regulator and the pin 44a acts as a force point of the lever member 45a.

Figure 10:
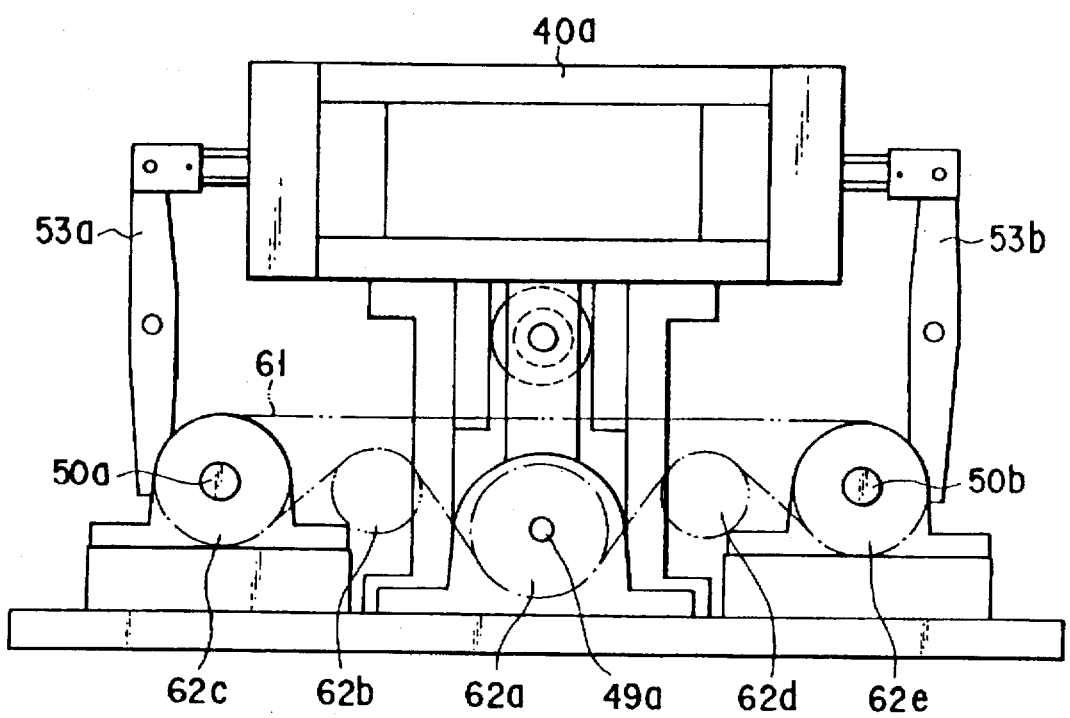
FIG. 10 is a front view of the apparatus of the embodiment shown in FIG. 7.

The lever member 45a is supported by a pin 48a acting as a movable fulcrum which is provided with a fulcrum regulator formed by a roller 47a inserted in guide groove 46a. The other end or action point of the lever member 45a is coupled to a crankshaft arm 49a of a crankshaft. The crankshaft arm 49a is coupled to cam shafts 50a and 50b through a belt 61 and rollers 62a, 62b, 62c, 62d, and 62e as shown in FIG. 10 and serving as a coupling member, and drives cams 51a and 51b mounted to the cam shafts 50a and 50b. The cams 51a and 51b drive valves 54a and 54b through lever members 53a and 53b having movable fulcrum regulators 52a and 52b, respectively.

Figure 8:
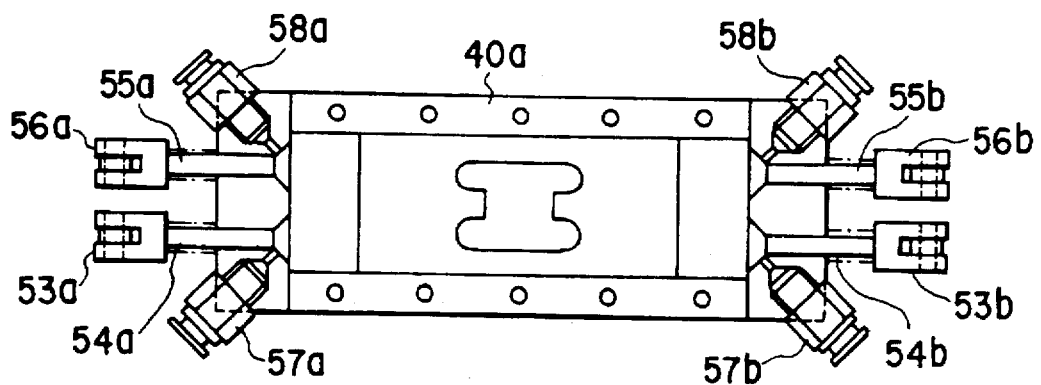
FIG. 8 is a plan view of the apparatus of the embodiment show in FIG. 7.

As shown in FIG. 8, in addition to the valve 54a, another valve 55a is provided to one side of the cylinder 40a. The valve 55a is driven by a lever member 56a in a similar manner. As shown in FIG. 8, in addition to the valve 54b, another valve 55b is provided to the other side of the cylinder 40a. The valve 55b is driven by a lever member 56b in a similar manner. Referring to FIG. 8, pairs of ignition plugs 57a and 57b, and 58a and 58b are respectively provided to the two sides of the cylinder 40a.

Figure 9:
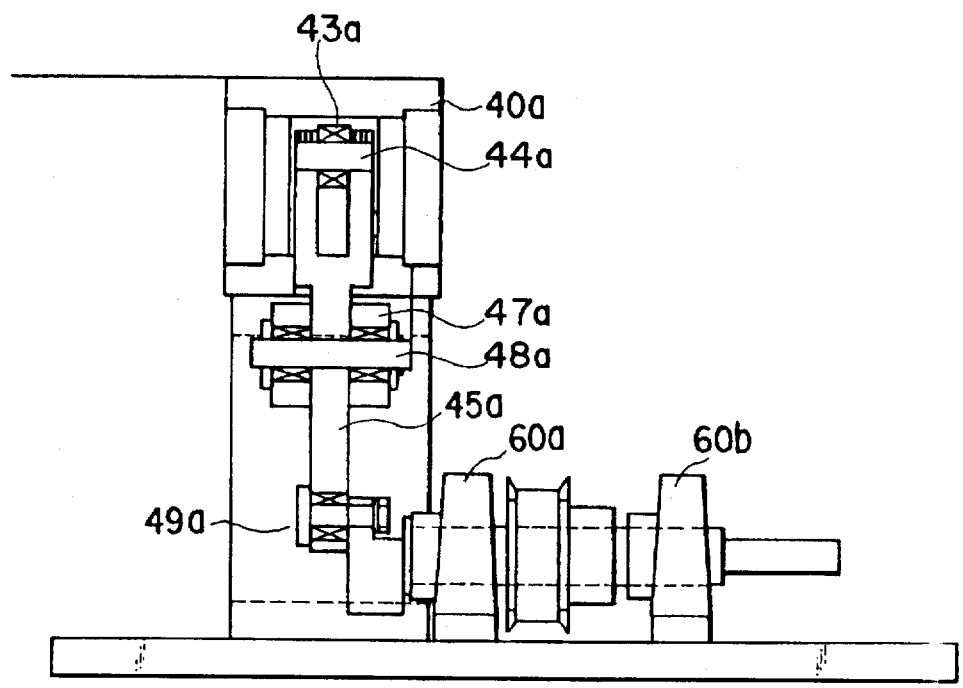
FIG. 9 is a sectional side view of the apparatus of the embodiment shown in FIG. 7.

FIG. 9 is a sectional side view taken along the portion of the lever member 45a shown in FIG. 7. The crankshaft arm 49a coupled to the lower end of the lever member 45a is rotatably supported by bearings 60a and 60b.

The engine shown in FIGS. 7 to 10 is basically the same as that shown in FIG. 5 and a description of the operation thereof will be omitted. In this engine, a lever member identical to the lever member 28 used between the piston 25 and the crankshaft 32 in FIG. 5 is employed in the driving mechanism of the valves 54a to 55b, so that the engine can be rotated at a higher speed.

Figure 11:
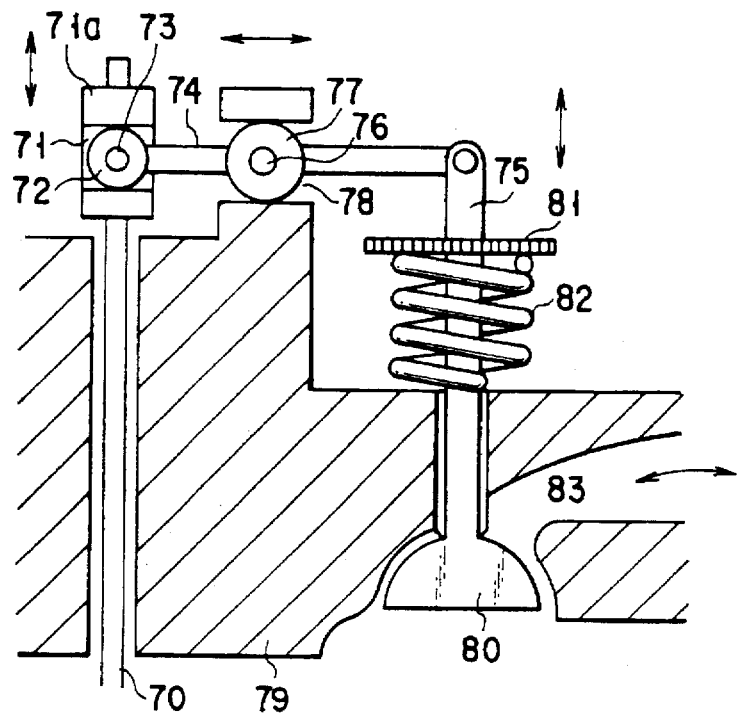
FIG. 11 is a schematic sectional view showing still another embodiment of the present invention.

Examples of a valve opening/closing mechanism will be described with reference to FIGS. 11 and 12. In FIG. 11, the valve opening/closing mechanism is applied to a tappet valve. A guide groove 71 of a force point regulator is formed in the distal end of a tappet 70 in a direction perpendicular to the moving direction of the tappet 70, and a roller 72 is inserted in the guide groove 71. The roller 72 is mounted to force point of a lever member 74 through a pin 73, and a valve shaft 75 is rotatably mounted to the action point or the other end of the lever member 74. The movable fulcrum of the lever member 74 is supported by a roller 77 through a pin 76, and the roller 77 is held on an engine body 79 through a guide groove 78 of a fulcrum regulator so that it can freely move in the longitudinal direction of the lever member 74.

A valve 80 is formed on the distal end of the valve shaft 75. A washer 81 is fixed to the valve shaft 75. The valve 80 formed on the distal end of the valve shaft 75 constantly closes, e.g., an exhaust hole 83 by the operation of a coil spring 82 inserted between the washer 81 and the engine body 79. The tappet 70 is regulated by the engine body 79 acting as an input movable force point regulator and the valise shaft 75 is regulated by the engine body 79 acting as an output action point regulator.

When the valve opening/closing mechanism is formed in this manner, the vertical movement of the tappet 70 regulated by the input force point regulator is smoothly transmitted to the valve shaft 75, and the movement of the valve shaft 75 is regulated by the output action point regulator as well as by a wall 71a on the upper side of the guide groove 71 formed in the distal end of the tappet 70. Thus, even if the engine speed increases, the valve 80 always follows the vertical movement of the tappet 70 precisely so as not to cause so-called crush. Therefore, the engine speed can remarkably increase as compared to the conventional engine.

Figure 12:
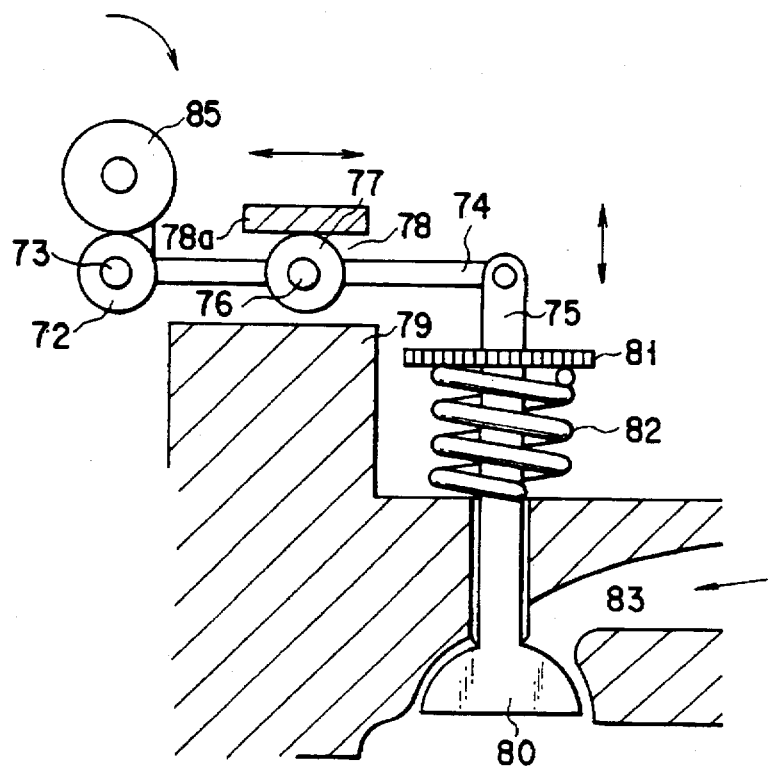
FIG. 12 is a schematic sectional view showing a modification of the embodiment shown in FIG. 11.

FIG. 12 shows an example in which the valve opening/closing mechanism is applied to an OHC (overhead cam) valve. FIG. 12 is different from FIG. 11 only in that the valve opening/closing mechanism is driven by an overhead cam 85 in place of the tappet 70 and that a guide groove 78 is formed between a guide plate 78a and an engine body 79. The operation of this mechanism is basically the same as that of FIG. 11.

All of the above embodiments are related to apparatuses for conversion between rotary motion and linear reciprocal motion. The following embodiments are related to apparatuses for directly converting rotary motion into reciprocal pivot motion of a lever member.

Figure 13:
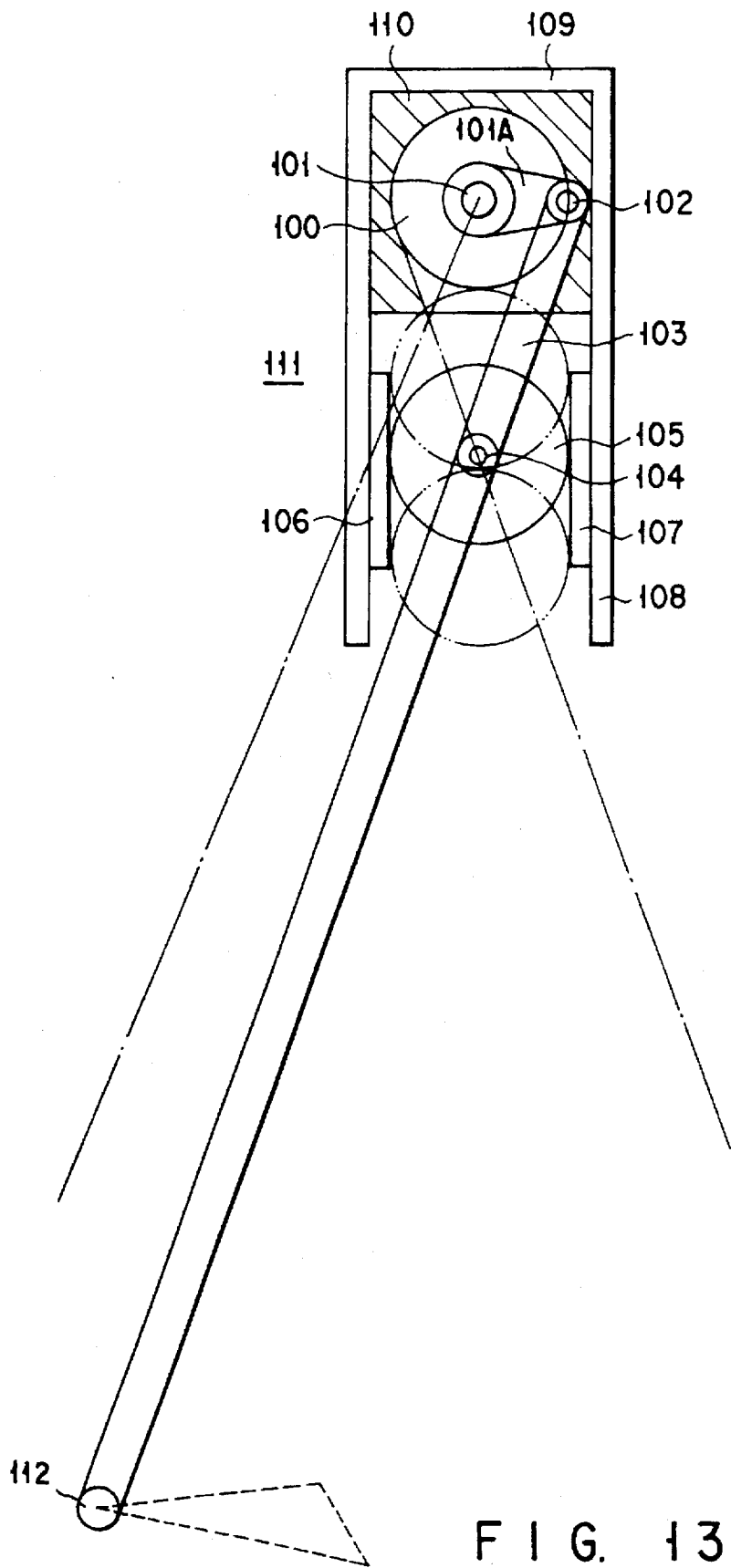
FIG. 13 is a schematic side view showing still another embodiment of the present invention.

FIG. 13 shows a basic actuator arrangement 111 of such an apparatus. Referring to FIG. 13, a rotor arm 101A is coupled to a motor 100 through a rotating shaft 101 and is driven by it. A lever member 103 is coupled to the other end of the rotor arm 101A through a pin 102, and a movable fulcrum 104 of the lever member 103 is rotatably supported between a pair of parallel guide plates 106 and 107 of a fulcrum regulator through a roller 105. All these constituent elements are housed in a rectangular case 109, and especially the portion of the motor 100 is sealed in a shock absorber filler 110.

In this arrangement 111, when power is supplied to the motor 100 to rotate the shaft 101, as the motor 100 rotates, the free end of the rotor arm 101A or the pin 102 performs a circular motion to form a trace having almost the same size as that of the length of the arm 101A. Accordingly, the roller 105 is linearly moved between the guide plates 106 and 107, and the lever member 103 reciprocally rotates about the movable fulcrum 104 as the center. By this arrangement, rotation of the rotary arm 101A is smoothly converted into the reciprocal motion of the lever member 103. Note that the angle of reciprocal swing motion of the lever member 103 can be changed by changing the ratio of the distances among the fulcrum 104, the force point 102, and the action point 112.

Figures 14A, 14B:
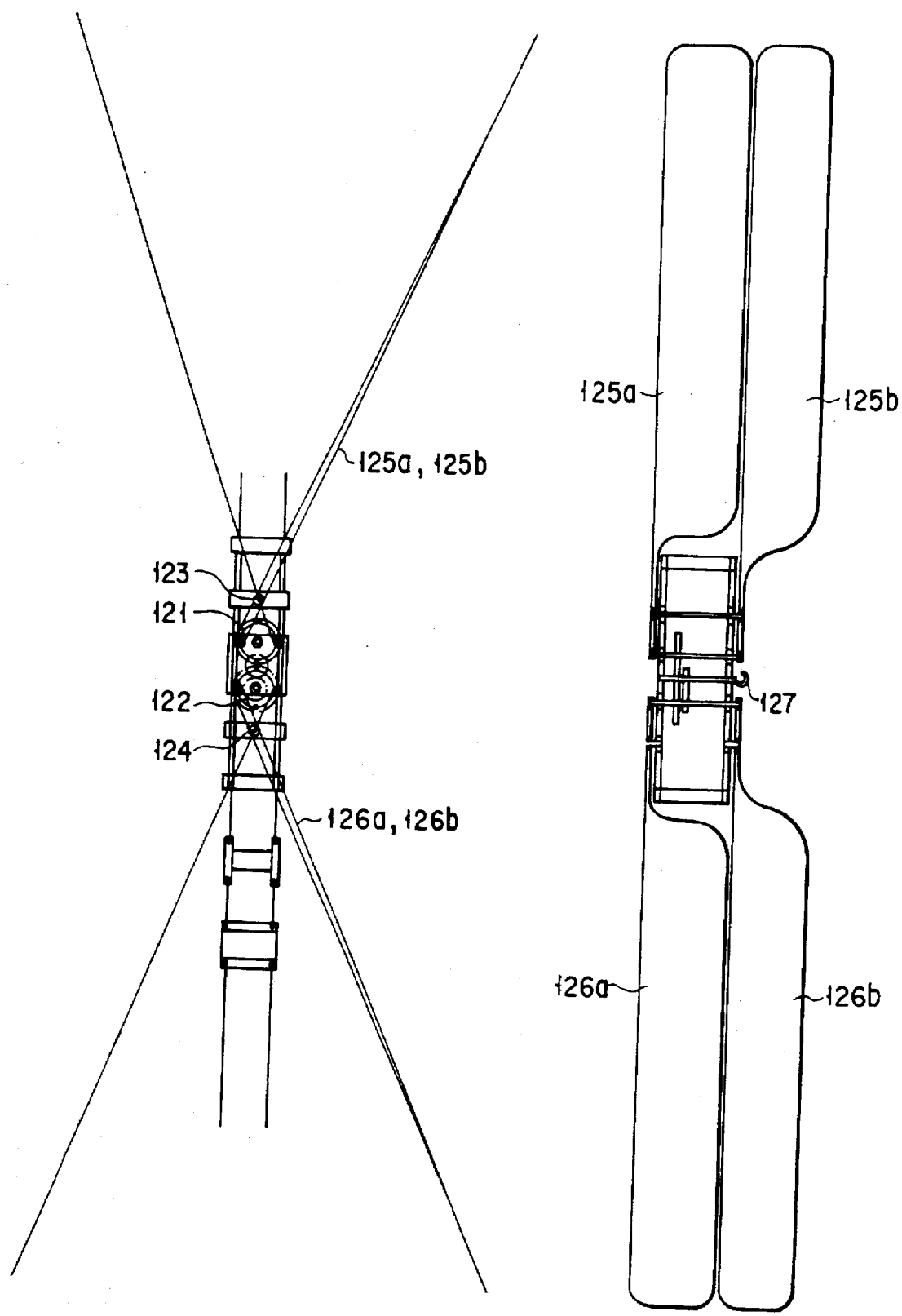
FIGS. 14A and 14B are schematic side views showing still another embodiment of the present invention.

In FIGS. 14A and 14B, the blades 125a, 125b, 126a, 126b of a flying object are constituted by using two sets of the basic arrangements 111 each identical to that shown in FIG. 13. FIG. 14A is a front view, and FIG. 14B is a plan view. Referring to FIGS. 14A and 14B, rotary disks 121 and 122 are coupled to the rotary shafts of the motors (not shown) and driven by them. Rotary motions of the disk 121 are transmitted to blades 125a, 125b and those of the disk 122 to blades 126a, 126b, respectively. Gears are formed at the periphery of the disks 121 and 122 so that the disks 121 and 122 are meshed with each other to drive the blades 125a, 125b in synchronism with the blades 126a, 126b. These blades are serving as lever members through movable fulcrum regulators 123 and 124, and converted into flapping. The disks 121 and 122 may be driven by other than the motors such as by a rubber string. In such a case, one end of the rubber string may be hooked to the hook 127.

FIG. 15 shows a structure in which one end of a lever member 133 is coupled to the peripheral portion of a rotary body 131 through a pin 132. In this case, the lever member 133 is used as the arm of a crane using a movable fulcrum 135. A balance weight 134 is provided at the rear end of the lever member 133 so that the lever member 133 can smoothly move as the crane.

In an embodiment of FIGS. 16 and 17, a support shaft 143 is inclinedly mounted to the rotating shaft of a motor 141 through a mounting member 142, a rotatable roller 145 acting as a moving fulcrum is mounted midway along the support shaft 143, and the roller 145 is sandwiched by two parallel guide plates 146 and 147 functioning as a moving fulcrum regulator. With this arrangement, the support shaft 143 forms a rotational trace forming a circular cone having the roller 145 as the vertex. Hence, when a triangular plate 148 is mounted to this support shaft 143, the plate 148 can be operated as the propeller of a boat.

Figure 18:
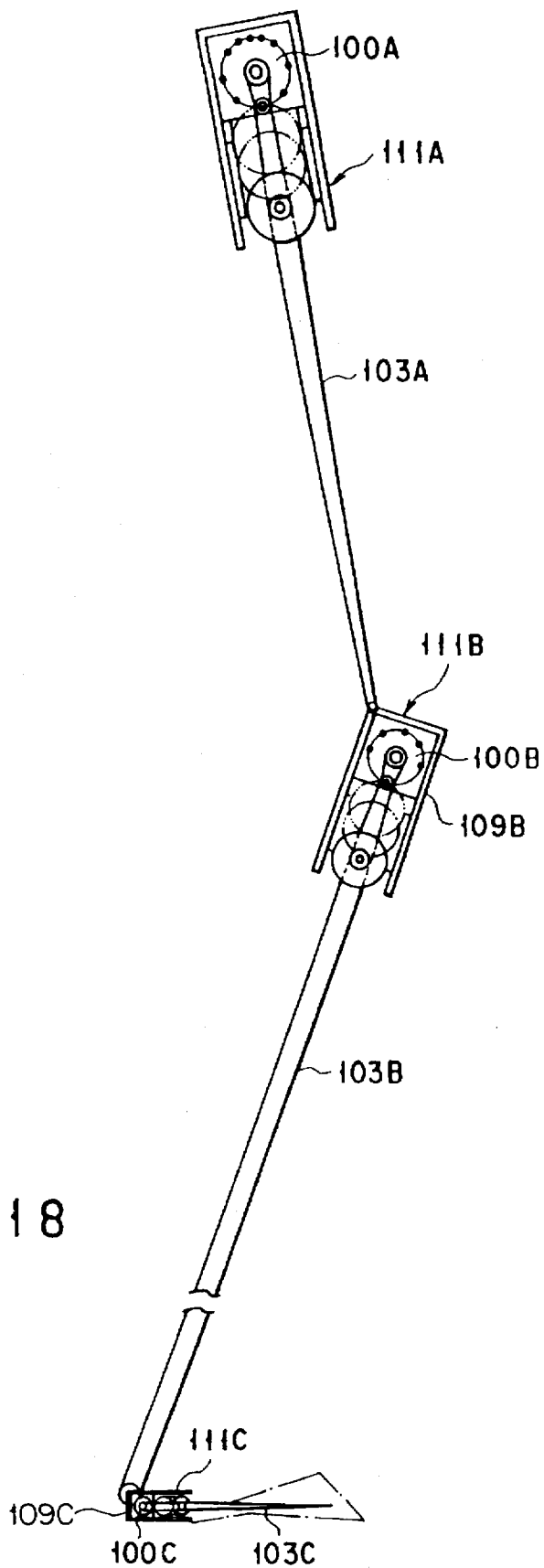
FIG. 18 is a schematic side view showing still another embodiment of the present invention.

FIG. 18 shows an example in which a humanoid foot is constituted by using three sets of the basic arrangements 111A, 111B and 11C each identical to that shown in FIG. 13. More specifically, the distal end of a lever member 103A of the basic arrangement 111A is fixed to a case 109B of the basic arrangement 111B, and the distal end of a lever member 103B of the basic arrangement 111B is fixed to a case 109C of the basic arrangement 111C. When disks 100A to 100C of the basic arrangements 111A to 111C are driven by motors (not shown), the respective lever members 103A to 103C are swung to perform the movement of the humanoid foot in which the lever member 103A acts as a femoral region, the lever member 103B as a leg and the lever member 103C as a foot.

Figure 19:
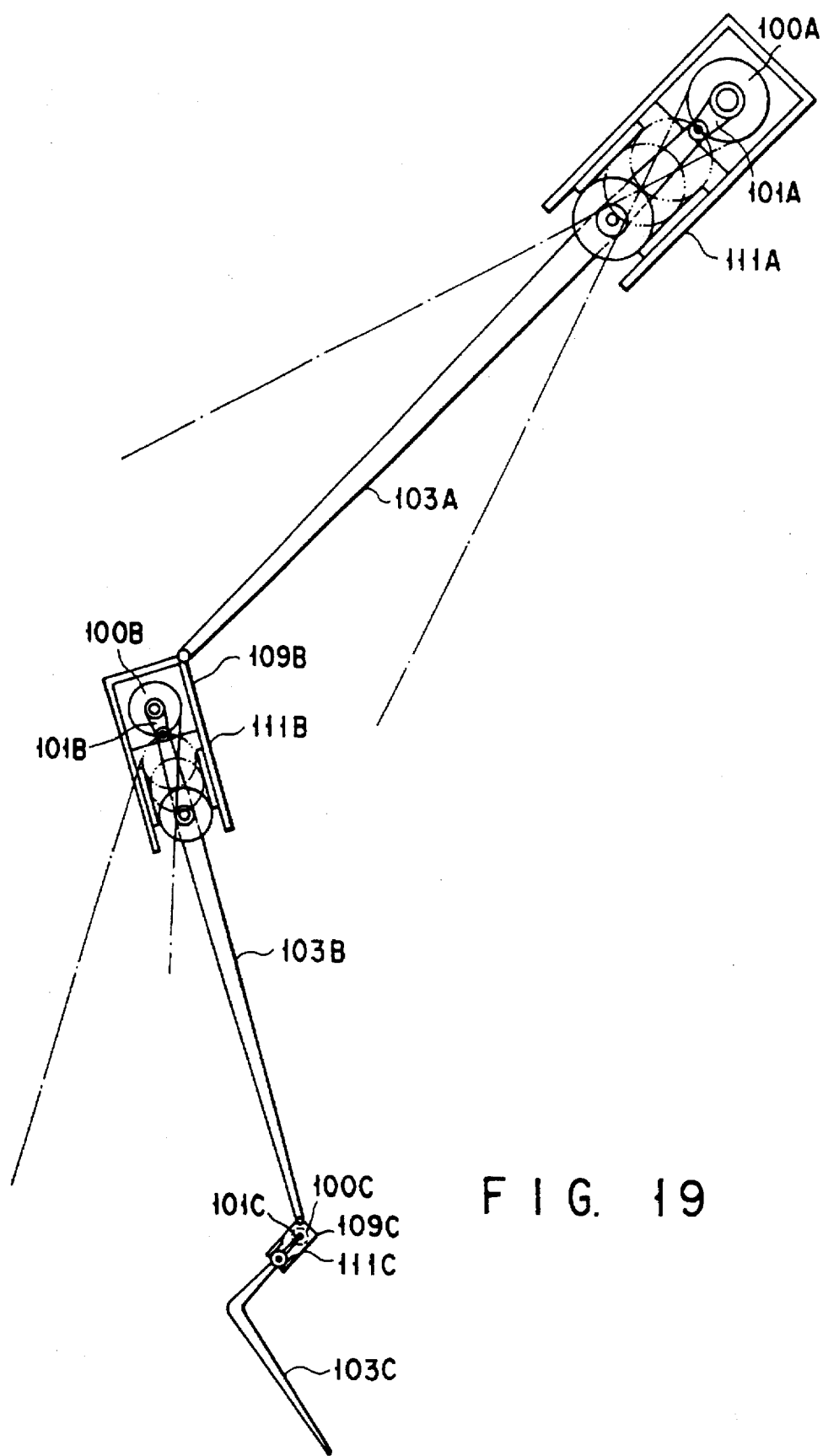
FIG. 19 is a schematic side view showing still another embodiment of the present invention.

FIG. 19 shows an example in which a humanoid arm is constituted by using three sets of the basic arrangements 111a, 111B and 11C each identical to that shown in FIG. 13. More specifically, the distal end of a lever member 103A of the basic arrangement 111A is fixed to a case 109B of a basic arrangement 111B, and the distal end of a lever member 103B of the basic arrangement 111B is fixed to a case 109C of a basic arrangement 111C. When disks 100A to 100C of the basic arrangements 111A to 111C are driven by motors 100a, 100B and 100C, the respective lever members 103A to 103C are swung to perform the movement of the humanoid arm in which the lever member 103A acts as an upper arm, the lever member 103B as an arm and the lever member 103C as a hand.

FIGS. 20A and 20B show still another embodiment of the present invention which is constituted as, e.g., the balancer of a robot. FIG. 20A is a side view, and FIG. 20B is a plan view. In this embodiment as well, two sets of the basic arrangements 111A and 11B each identical to that shown in FIG. 13 are used. The distal end of a lever member 103A of the first basic arrangement 111A is fixed to the distal end of a fixed arm 151, projecting from the rear portion of a case 109B of the second basic arrangement 111B, at an angle of 90°. A columnar weight 152 is mounted to the distal end of a lever member 103B of a second basic arrangement 111B. Accordingly, the pivot direction of the lever member 103A of the first basic arrangement 111A and that of the lever member 103B of the second basic arrangement 111B form an angle of 90°. As a result, if this balancer is mounted to, e.g., a robot which walks with two feet and the lever members 103A and 103B of the basic arrangements 111A and 111B are pivoted in accordance with the output from the attitude sensor of the robot by driving the lever members 103A and 103B by means of the motors 100A and 100B, respectively, a very fine attitude control operation can be performed.

Figure 21:
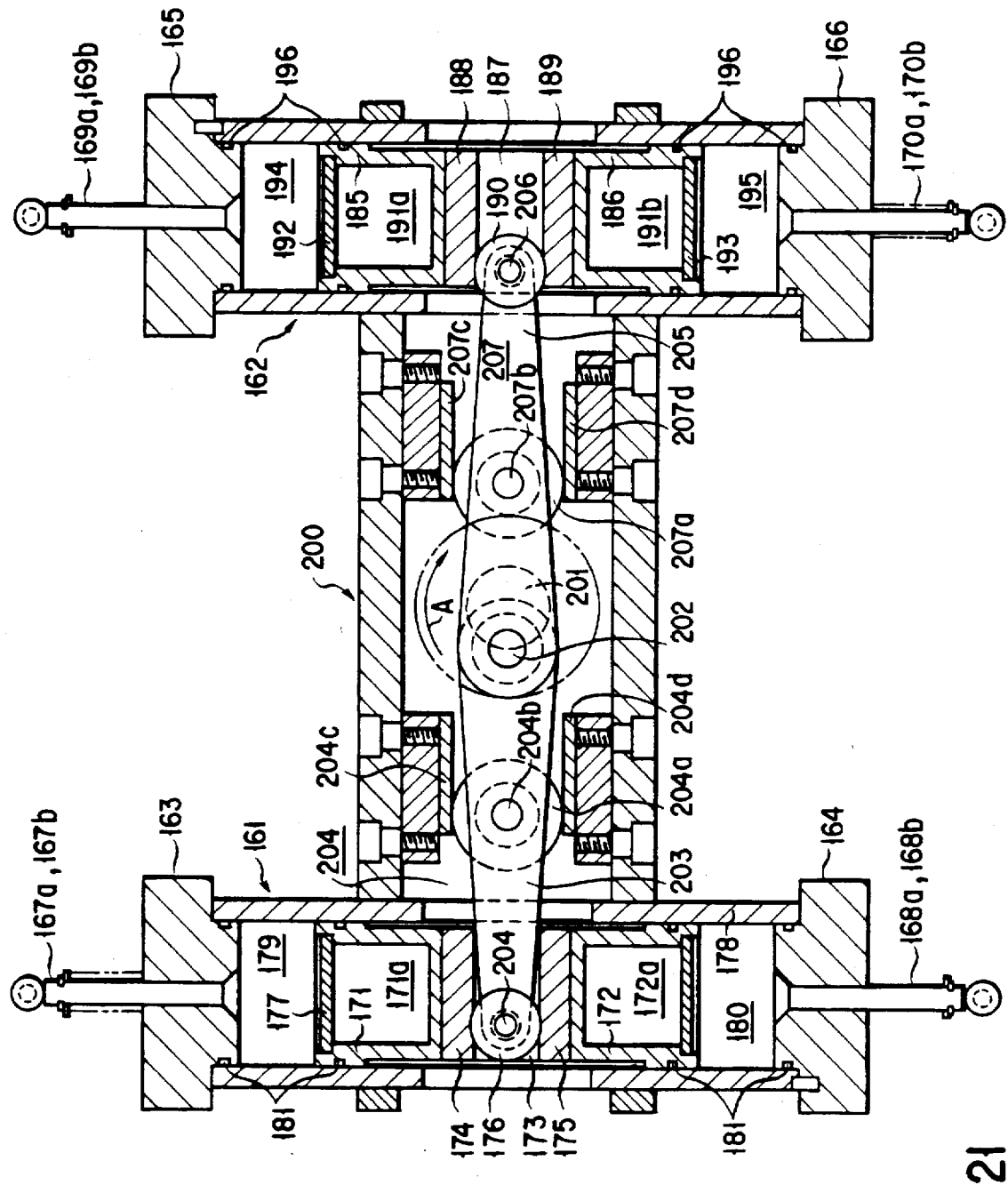
FIG. 21 is a front view showing still another embodiment of the present invention.

FIG. 21 shows a four-cylindered radial engine according to still another embodiment of the present invention. In the figure, first and second common cylindrical cylinders 161 and 162 are so arranged that the axes of the cylinders 161 and 162 are parallel with each other. Both ends of the cylinders 161 and 162 are closed by head covers 163, 164, 165 and 166. Two valves 167a, 167b are mounted through the head cover 163. In the similar manner, valves 168a, 168b, 169a, 169b, 170a and 170b are mounted through the head covers 164, 165 and 166.

First and second piston members 171 and 172 are provided in the cylinder 161 and are connected with each other by a connecting member 173. Two guide plates 174 and 175 are provided between the piston members 171 and 172 so that a roller 176 can be moved freely between the guide plates 174 and 175 in the direction normal to the axial direction of the cylinder 161. Recesses 171a and 172a are formed in the piston members 171 and 172 to decrease the weight thereof, and the open ends of the recesses 171 and 172 are closed by piston plates 177 and 178 so that combustion chambers 179 and 180 are formed between head covers 163, 164 and piston plates 174, 175. Sealing members or piston rings 181 are provided for sealing the combustion chambers 179, 180 at the gaps between the piston members 171, 172 and the cylinder 161.

In the similar manner, first and second piston members 185 and 186 are provided in the cylinder 162 and are connected with each other by a connecting member 187. Two guide plates 188 and 189 are provided between the piston members 185 and 186 so that a roller 190 can be moved freely between the guide plates 188 and 189 in the direction normal to the axial direction of the cylinder 162. Recesses 191a and 191b are formed in the piston members 185 and 186 to decrease the weight thereof, and the open ends of the recesses 185 and 186 are closed by piston plates 192 and 193 so that combustion chambers 194 and 195 are formed between head covers 165, 166 and piston plates 192, 193. Sealing members 196 are provided for sealing the combustion chambers 194, 195 in the similar manner as in the cylinder 161.

Cylinders 161 and 162 are fixed to a frame 200 so that the cylinders 161 and 162 are parallel with each other to have a center rod 201 of a crankshaft 202 being in a direction normal to the axes of the cylinders 161 and 162.

The roller 176 is rotatably mounted to one end of a lever member 203 through a pin 204. The lever member 203 is supported by a movable fulcrum 204 constituted by a supporting roller 204a through a pin 204b between guide plates 204c, 204d functioning as a moving fulcrum regulator for movably supporting the lever member 203 in the longitudinal direction thereof. The other end of the lever member 203 is coupled to a power receiving portion of the crankshaft 202 rotatably. In the similar manner, the roller 190 is rotatably mounted to one end of a lever member 205 through a pin 206. The lever member 205 is supported by a movable fulcrum 207 constituted by a supporting roller 207a through a pin 207b between guide plates 207c, 207d of a moving fulcrum regulator for movably supporting the lever member 205 in the longitudinal direction thereof. The other end of the lever member 205 is coupled to a power receiving portion of the crankshaft 202 rotatably.

When a spark or ignition plug (not shown) is energized in the combustion chamber 179, the fuel-air mixture or the combustion gas introduced into the chamber 179 through the valve 167a, for example, is fired to push the piston members 171 and 172 toward the head cover 164 so as to compress the combustion gas introduced into the chamber 180 through the inlet valve 168a, for example. At the same time, combustion gas is introduced into the chamber 194 and the combustion gas is exhausted from the chamber 195 through the exhaust valve 170b, for example.

When the piston member 171 is pushed toward the chamber 180, the roller 176 guided between the plates 174 and 175 is also moved in the same direction and the lever member 203 is swung in the counterclockwise direction around the pin 204b of the roller 204a while the roller 204a is guided between the plate 204c and 204d in the longitudinal direction of the lever member 203, thereby rotating the crankshaft 202 in the clockwise direction about the center rod 201.

As a result of this operation, the piston member 171 goes to its lower dead point and the piston member 172 goes to its upper dead point where the introduced combustion gas is compressed in the chamber 180. When the compressed combustion gas is fired in the chamber 180 by an ignition plug (not shown), the piston member 172 is pushed toward the head cover 163 to rotate the lever member 203 in the clockwise direction about the movable fulcrum 204 to further rotate the crankshaft 202 in the clockwise direction as shown by an arrow A.

Thus, so-called explosion steps occur in the chambers 179, 180, 194 and 195 in the order mentioned and so-called four-cycle steps, i.e., inlet, compression, explosion and exhaust steps are performed at each of the chambers 179, 180, 194 and 195 to rotate the crankshaft 202 continuously.

According to the embodiment of FIG. 21, it is possible to form a four-cylinder engine using two cylinders 161 and 162, thereby enabling to reduce the size, weight and volume of the reciprocating engine.

Further, since the piston motion is transmitted to the crankshaft using the movable fulcrum type lever member 203, no side thrust of the piston members 171, 172, 185 and 186 with respect to the inner walls of the cylinders 161 and 162 occur, thereby transmitting the motion of the piston members very smoothly to decrease the energy loss. Accordingly, it is possible to decrease the idling speed from 1000 rpm to 50 rpm, for example. Further, since the lever members 203 and 205 can be formed to have the same length with each other, it is possible to design the distance from the axis of the cylinder 161 to the center of the crankshaft rod 201 to be equal to that between the axis of the cylinder 162 and the center of the rod 201 so as to minimize the vibration of the four-cycle reciprocating engine.

Further, since no side thrust occurs at the piston members 171, 172, 185 and 186 with respect to the inner walls of the cylinders 161 and 162, it is possible to form the piston members as ceramic pistons, thereby reducing the weight of the piston members as well as the total weight of the engine.

Figure 22:
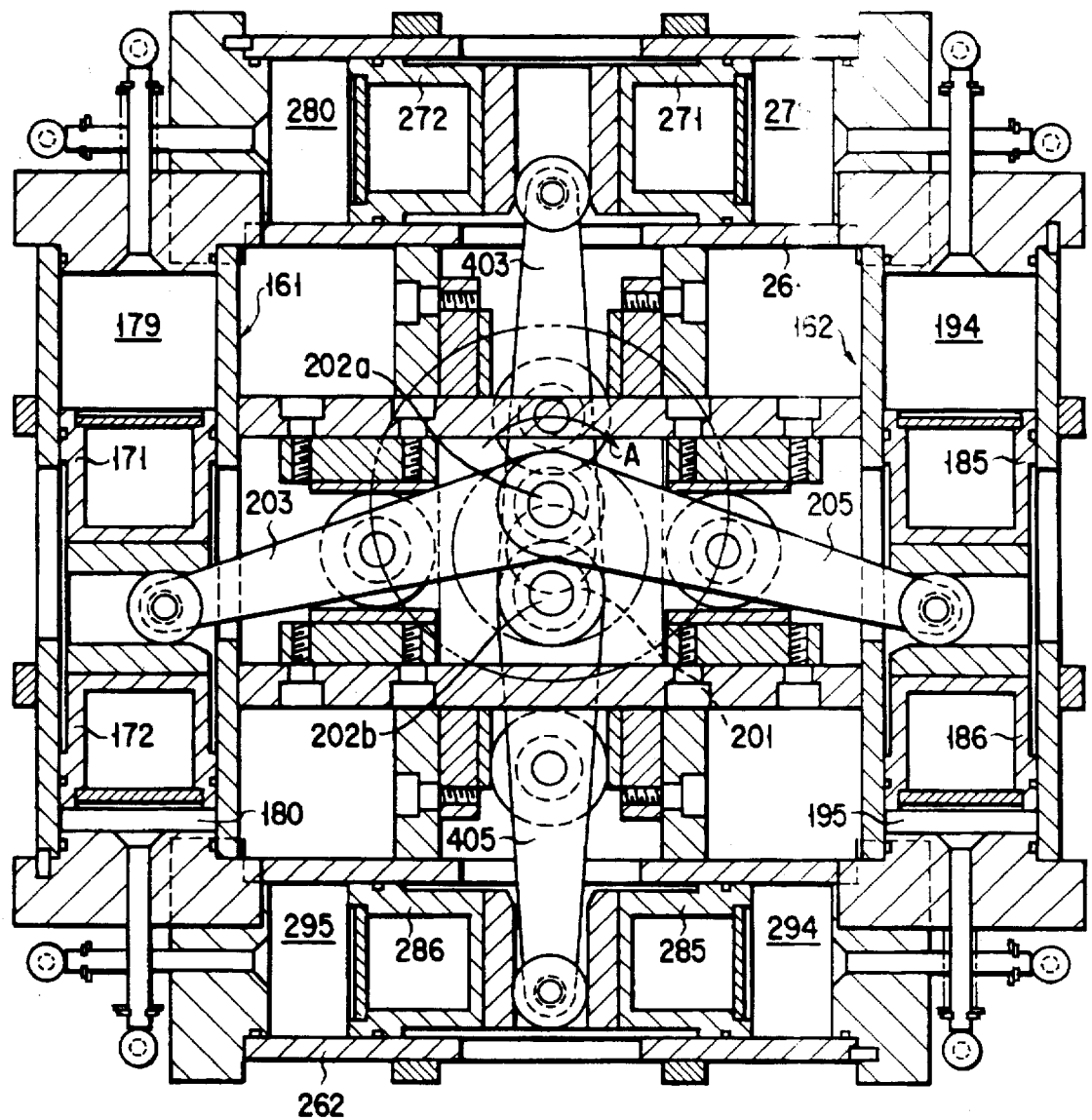
FIG. 22 is a front view showing a still further embodiment of the present invention.

FIG. 22 shows a radial engine with 8 cylinders embodied in accordance with the present invention wherein two sets of the four-cylindered engine as shown in FIG. 21 are combined to form the 8-cylindered reciprocating engine. The 8-cylindered engine of FIG. 22 can be formed using four cylinders 161, 162, 261 and 262. The cylinders 161 and 162 have the same structure as those shown in FIG. 21. Therefore, explanations of the structure with respect to the cylinders 161 and 162, as well as those of the cylinders 261 and 262 can be omitted here except for the fact that the lever members 203 and 205 are connected to one crankshaft arm 202a and the lever members 403 and 405 are connected to another crankshaft arm 202b apart from the arm 202a by 180 degrees with respect to the center of the crankshaft rod 201.

Now, operations of the 8-cylindered reciprocating engine will be described. In FIG. 22, the piston member 171 is positioned at its lower dead point as a result of the explosion step in the combustion chamber 179 in the cylinder 161. In the same time, the piston member 185 is also positioned at its lower dead point as a result of the explosion step in the combustion chamber 194 in the cylinder 162. At this time, the chambers 180 and 195 are in the last stage of the compression stroke, while, piston members 271, 272, 285 and 286 are at the mid position in the cylinders 261 and 262, respectively.

When the compressed fuel gas in the chambers 180 and 195 is ignited by ignition plugs (not shown), the lever members 203 and 205 are swung in the clockwise and counterclockwise directions, respectively, to rotate the crankshaft rod 201 in the direction shown by the arrow A. Accordingly, the lever members 403 and 405 rotate in the clockwise and counterclockwise directions, respectively, thereby compressing the fuel gas in the chambers 280 and 295 and the fuel gas is inlet into the chambers 279 and 294, respectively.

According to the present embodiment of FIG. 22, all the lever members 203, 205, 403 and 405 can be made identically so that whole structure of the 8-cylindered engine can be formed symmetrically with respect to the crankshaft center rod 201, thereby further canceling the vibration in the engine.

As has been described above in detail, according to the present invention, an apparatus for mutual conversion between circular motion and reciprocal motion can be provided, which can decrease an energy loss when converting the reciprocal motion of, e.g., the piston of a four-cycle reciprocating engine into rotary motion of the crankshaft, and which can be reduced in weight by using a ceramic as the material to form the apparatus.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An apparatus for mutual conversion between circular motion and reciprocal motion, comprising:
   a rotary motor; and
   a lever member having a fulcrum as well as a force point and an action point, the force point being rotatably mounted at a point on a line connecting a rotational center and a circumference of the rotary motor, the action point being provided with a first regulator and the fulcrum being provided with a second regulator for operating the fulcrum as a movable fulcrum, and the action point provided with the first regulator being coupled to a reciprocating body of a reciprocated machine;
   wherein the first and second regulators include guide members for guiding the action point and the fulcrum to be movable in a longitudinal direction of the lever member;
   wherein said first regulator includes a first pair of said guide members and a first roller guided between said first pair of guide members, said first roller being pivoted at the action point of the lever member; and
   wherein said second regulator includes a second pair of guide members and a second roller guided between said second pair of guide members, said second roller being pivoted at the fulcrum of the lever member.

2. An apparatus according to claim 1, further comprising:
   a cylindrical piston in which is fixed said first pair of guide members of said first regulator for guiding said first roller;
   a cylinder in which said cylindrical piston is inserted; and
   a pair of inlet and exhaust units including opening/closing valves mounted to one end face of the cylinder.

3. An apparatus according to claim 2, wherein said rotary motor functions as a power generator when said rotary motor is driven by a reciprocal motion of said piston.

* * * * *